United States Patent [19]
Kim

[11] Patent Number: 5,985,478
[45] Date of Patent: Nov. 16, 1999

[54] PRESSURE RESPONSIVE CAP ASSEMBLY FOR RECTANGULAR BATTERY

[75] Inventor: Chang-seob Kim, Suwon, Rep. of Korea

[73] Assignee: Samsung Display Devices Co., Ltd., Kyungki-do, Rep. of Korea

[21] Appl. No.: 09/052,009

[22] Filed: Mar. 31, 1998

[30] Foreign Application Priority Data

Sep. 29, 1997 [KR] Rep. of Korea ................ 97-49748

[51] Int. Cl.[6] .................................................. H01M 2/12
[52] U.S. Cl. ........................... 429/53; 429/54; 429/56; 429/72
[58] Field of Search ................... 429/53, 54, 56, 429/72, 79, 82, 175, 185

[56] References Cited

U.S. PATENT DOCUMENTS

| | | | |
|---|---|---|---|
| 4,581,304 | 4/1986 | Beatty et al. | 429/56 |
| 5,665,483 | 9/1997 | Saito et al. | 429/53 |
| 5,677,076 | 10/1997 | Sato et al. | |

FOREIGN PATENT DOCUMENTS

| | | |
|---|---|---|
| 0573998 | 12/1993 | European Pat. Off. . |
| WO97/16859 | 5/1997 | WIPO . |
| WO97/33334 | 9/1997 | WIPO . |

*Primary Examiner*—Maria Nuzzolillo
*Assistant Examiner*—Monique Wills
*Attorney, Agent, or Firm*—Lowe Hauptman Gopstein Gilman & Berner

[57] ABSTRACT

There is provided a cap assembly for a rectangular battery comprising a cap cover in which a vent hole is formed, a positive electrode terminal which has a through hole leading to the discharge hole and combines with the upper portion of the cap cover having an insulating plate interposed therebetween, a positive electrode tab connected to a positive electrode of an electrode assembly, a conductive safety vent support having a hollow rivet protrusion passing through the vent hole of the cap cover and the through hole of the positive electrode terminal to be coupled to the positive electrode terminal, and a conical conductive safety vent whose upper circumferential portion combines with the bottom surface of the safety vent support to seal the hollow of the rivet protrusion, and whose vertex contacts the upper surface of the positive electrode tab, wherein the vertex of the safety vent separates from the positive electrode tab when the internal pressure of the battery increases to a predetermined level.

5 Claims, 4 Drawing Sheets

PRESSURE RESPONSIVE CAP ASSEMBLY FOR RECTANGULAR BATTERY

BACKGROUND OF THE INVENTION

1. Field of the Invention

The present invention relates to a cap assembly for a rectangular battery, and more particularly, to a cap assembly for a rectangular battery wherein power can be cut off simultaneously when a safety vent is broken due to an increase in internal pressure of a battery.

2. Description of Related Art

A rectangular battery has been widely used as a secondary battery, and contains an electrode assembly in a rectangular case. FIG. 1 shows an example of the rectangular battery. As shown in FIG. 1, a cylindrical or rectangular electrode assembly (not shown), called a jelly-roll, is installed inside a rectangular case 1 having an open upper surface. The jelly-roll is formed by winding anode and cathode plates (not shown) with a separator (not shown) being interposed therebetween as an insulator. A cap assembly 10 is installed at the upper portion of the case 1.

The cap assembly 10 includes a positive electrode portion 11, a negative electrode portion 12 and an insulating plate 13 for electrically insulating the positive and negative electrode portions 11 and 12 from each other.

When the rectangular battery reacts abnormally, the internal pressure in the case 1 increases due to generation of a gas, so the case 1 may be exploded.

Thus, in order to prevent that kind of explosion and reduce the internal pressure in the case 1, a fracture portion 14 for discharging a gas generated during the reaction is formed at the negative electrode portion 12. That is, when the internal pressure of the battery increases, the edges, which is weak in rigidity, of the fracture portion 14 is destroyed to form a safety vent through which the generated gas is discharged.

In the conventional cap assembly, the internal pressure of the battery can be reduced by destroying the fracture portion 14, but the flow of current is not blocked off. Therefore, a short circuit or an electric leakage can be generated after breakdown of the fracture portion.

SUMMARY OF THE INVENTION

To solve the above problem, an object of the present invention is to provide an improved cap assembly for a rectangular battery in which current is cut simultaneously with the discharge of a gas to reduce the internal pressure of a battery.

To accomplish the above object, there is provided a cap assembly for a rectangular battery comprising a cap cover in which a vent hole is formed; a positive electrode tab connected to a positive electrode of an electrode assembly;

a conductive safety vent support having a hollow rivet protrusion passing through said vent hole of said cap cover; and a conductive safety vent whose upper circumferential portion combines with the bottom surface of said safety vent support to seal the hollow of said rivet protrusion, and whose vertex contacts the upper surface of said positive electrode tab, wherein said vertex of said safety vent separates from said positive electrode tab and said safety vent is destroyed when the internal pressure of said battery increases to a predetermined level.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
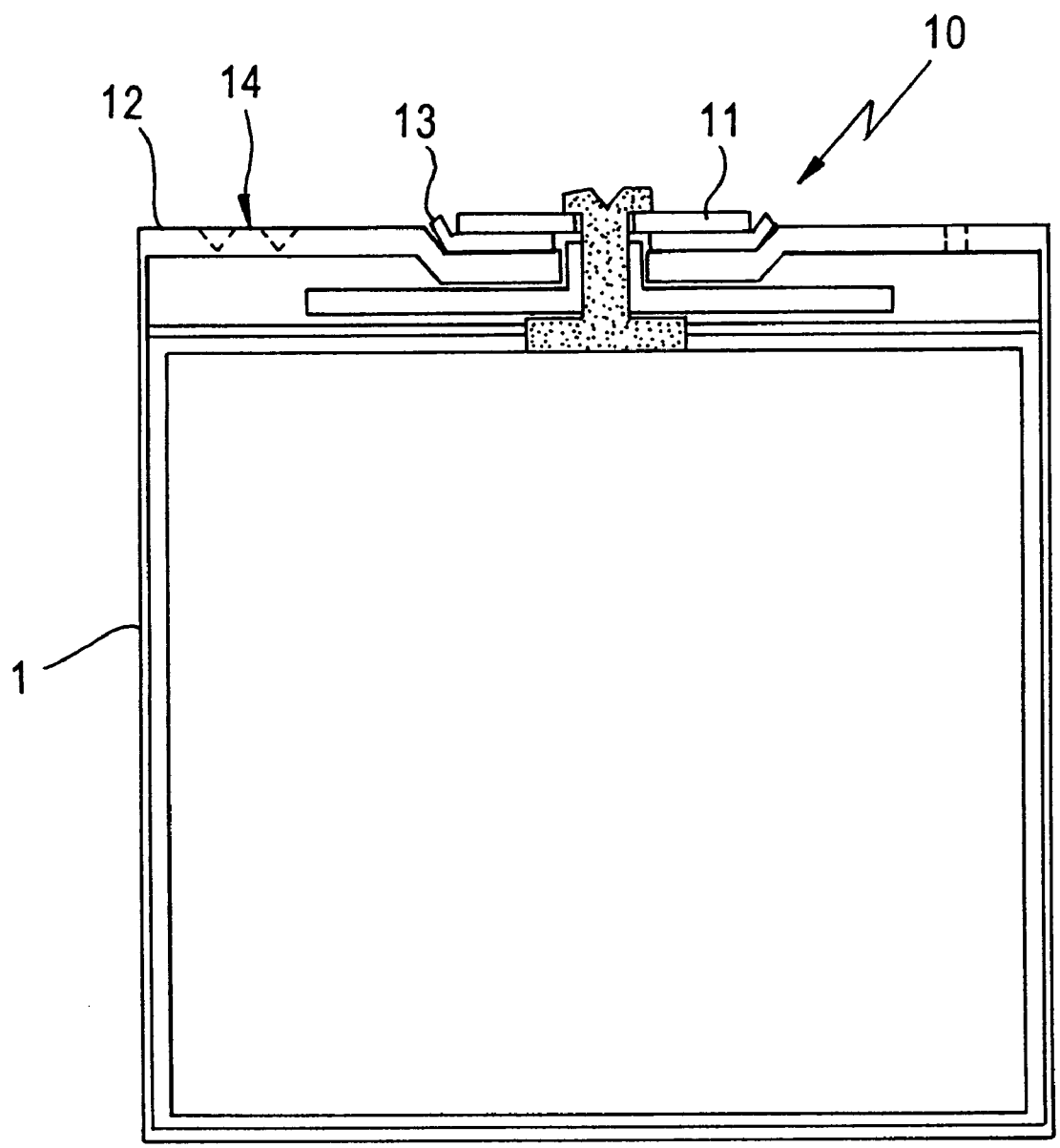
FIG. 1 is a sectional view schematically showing a rectangular battery having a conventional cap assembly.
Figure 2:
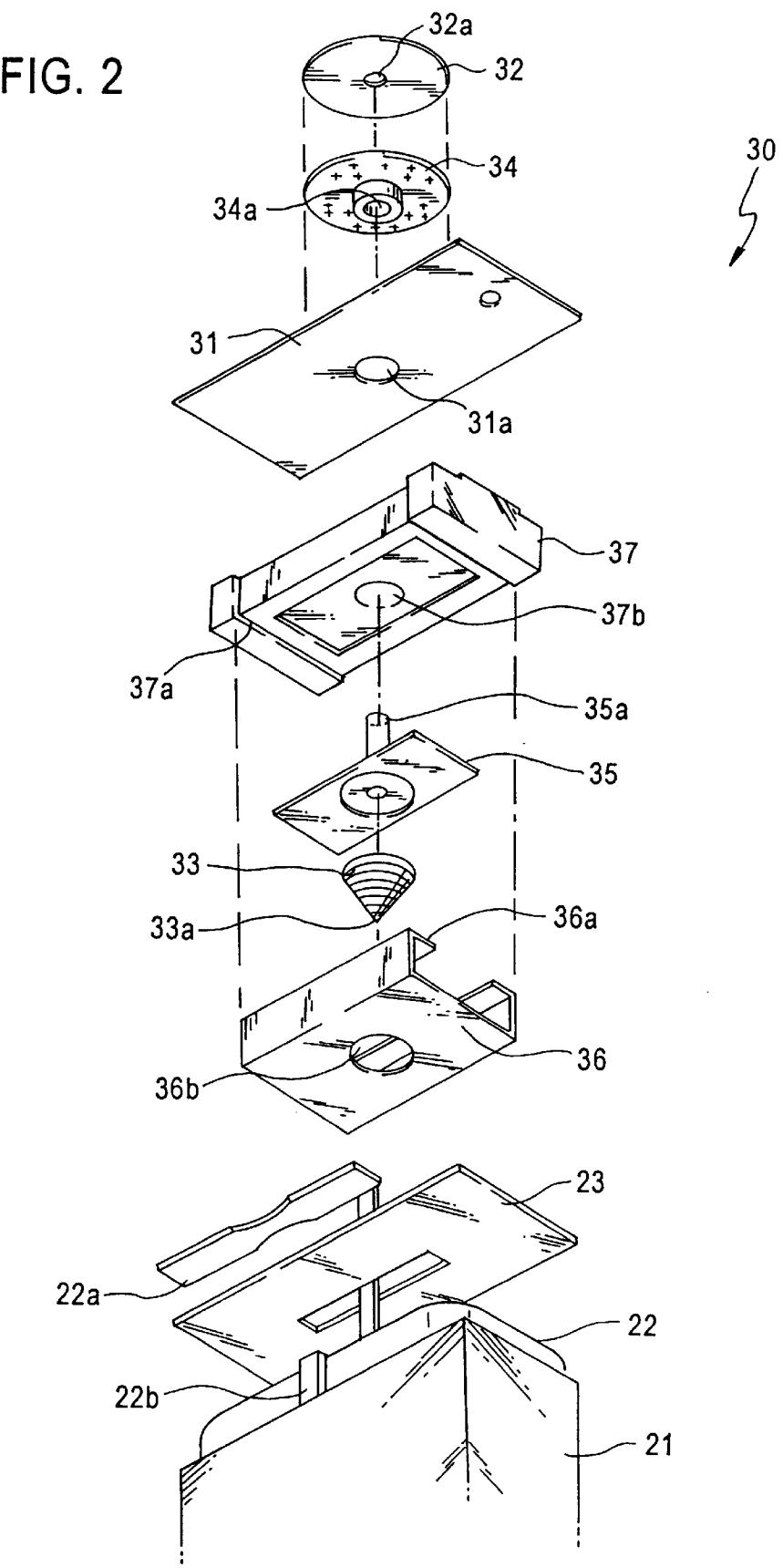
FIG. 2 is an exploded perspective view of a rectangular battery having a cap assembly according to the present invention.

Referring to FIG. 2, a rectangular battery having a cap assembly according to the present invention includes an electrode assembly 22 formed in a rectangular case 21 by winding anode and cathode plates, which are coated by an active material, with a separator which is made of a porous polymer film, being interposed therebetween; and a cap assembly 30 combined on the upper portion of the case 21. An insulating plate 23 is interposed between the electrode assembly 22 and the cap assembly 30. The cap assembly 30 is electrically connected by a positive electrode tab 22a, which penetrates the insulating plate 23 and connects to a positive electrode of the electrode assembly 22, and a negative electrode tab 22b.

Figure 3:
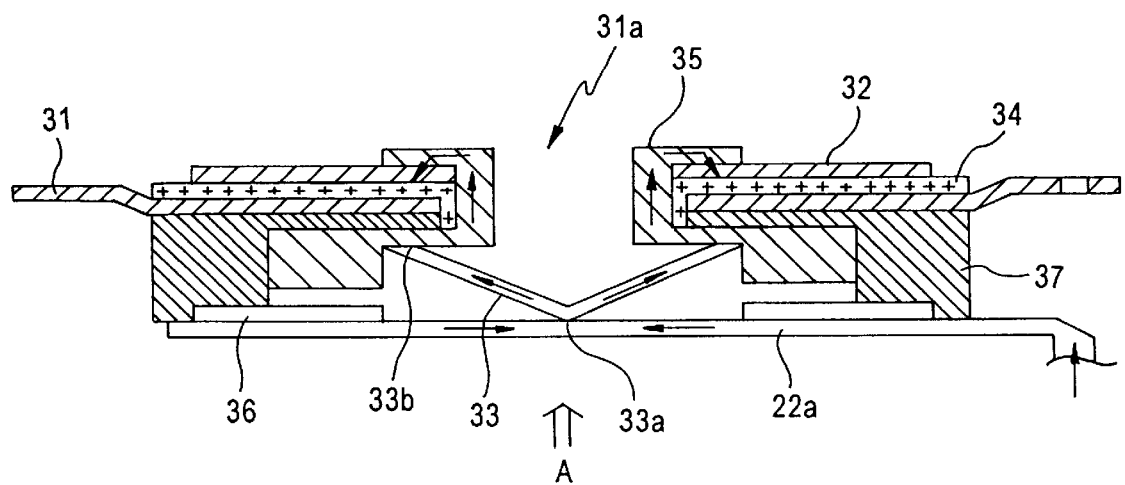
FIG. 3 is a sectional view of the cap assembly according to the present invention.
Figure 4:
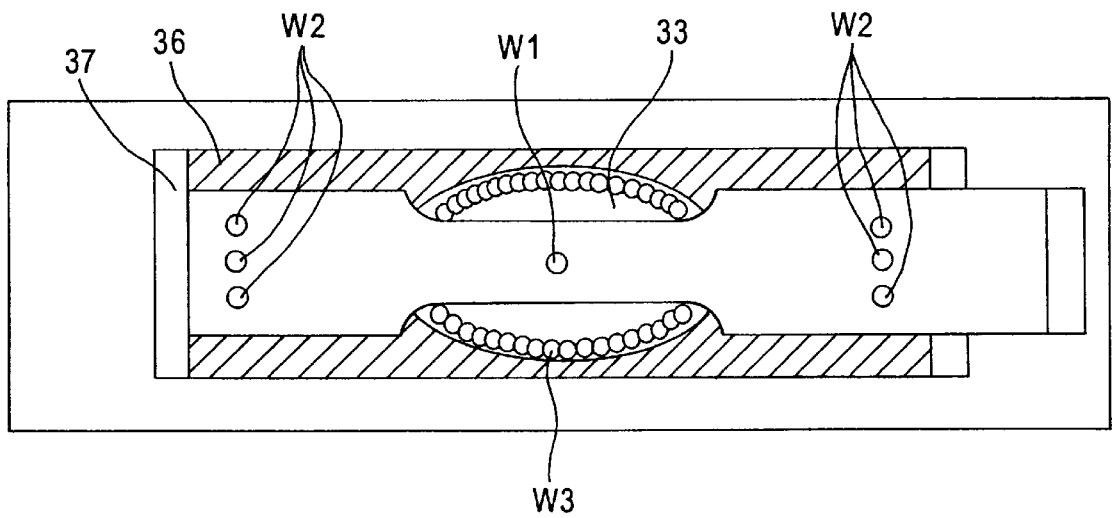
FIG. 4 is the cap assembly of FIG. 3 viewed from the perspective of "A" in FIG. 3.

Referring to FIGS. 3 and 4 showing the configuration of the cap assembly 30 in detail, the cap assembly 30 includes a cap cover 31 in which a vent hole 31a is formed; a positive electrode terminal 32 formed over the cap cover 31; and a conic conductive safety vent 33 whose upper circumferential portion is combined with the bottom surface of a safety vent support 35 to seal the discgarge hole 31a. The vertex 33a of the safety vent 33 is combined in contact with the upper surface of the positive electrode tab 22a. At this time, it is preferable that a welding portion (W1) between the vertex 33a and the positive electrode tab 22a is welded by a laser. As will be described later, when the internal pressure of the battery increases, the vertex 33a is disconnected from the positive electrode tab 22a to prevent current from flowing.

The cap assembly 30 can further include a tab fixing portion 36 for supporting the positive electrode tab 22a to prevent the positive electrode tab 22a from being pulled and damaged when the vertex 33a is separated from the positive electrode tab 22a; and a support 37 for supporting the tab fixing portion 36. The tab fixing portion 36 is combined with a welding portion (W2) on the upper surface of the positive electrode tab 22a by a laser welding method. A hooking portion 36a formed on the tab fixing portion 36 hangs on a combining portion 37a formed in the support 37, thereby retaining the tab fixing portion 36.

The tab fixing portion 36 and the support 37 have through holes 36b and 37b leading to the vent hole 31a of the cap cover 31, respectively. An insulating plate 34 lies interposed between the cap cover 31 and the positive electrode terminal 32.

Also, a conductive safety vent support 35 is provided to more safely combine the safety vent 33. The safety vent support 35 has a rivet protrusion 35a through which a hollow is formed being connected to the vent hole 31a of the cap cover 31. The rivet protrusion 35a inserts into the through hole 37b of the support 37, the vent hole 31a of the cap cover 31, the through hole 34a of the insulating plate 34, and the through hole 32a of the positive electrode terminal 32, and then is pressed flat using a press or another tools. In the case that the safety vent support 37 is employed, the upper circumferential portion 33b of the safety vent 33 combines with the bottom surface of the safety vent support 35 to seal the hollow of the rivet protrusion 35a. A welding portion (W3) between the upper portion of the safety vent 33 and the safety vent support 35 is welded using a laser.

In the operation of the rectangular battery, current flows toward the positive electrode terminal 32 via the positive electrode tab 22a, the safety vent 33 and the safety vent support 35, as shown in FIG. 3. When the battery is charged or discharged, the temperature inside the battery increases due to conditions such as overcurrent, overcharge, etc. Accordingly, a gas is generated from a chemical material including an electrolyte, thus increasing the internal pressure of the battery. At this time, the safety vent 33 is pressed by pressure of the gas generated inside the battery.

When the internal pressure of the battery increases to a predetermined level or higher, the welding portion (W1) between the vertex 33a of the safety vent 33 and the positive electrode tab 22a is destroyed, so that the safety vent 33 separates from the positive electrode tab 22a. Therefore, the flow of current is stopped. At this time, the positive electrode tab 22a can be safely maintained since it is supported by the tab fixing portion 36.

When the internal pressure of the battery increases more and more, the safety vent 33 made of a thin plate is broken, so that the gas in the battery is discharged to outside the battery via the vent hole 31a. Thus, the internal pressure of the battery is reduced.

According to the cap assembly 30 for the rectangular battery of the present invention, when the internal pressure of the battery increases excessively, the conic safety vent 33 is destroyed to thereby discharge a gas in the battery and prevent flow of current. Therefore, the safety of a battery can be guaranteed, so that an over current or leakage can be prevented.

What is claimed is:

1. A cap assembly for a rectangular battery comprising:
   a cap cover in which a vent hole is formed;
   a positive electrode tab connected to a positive electrode of an electrode assembly;
   a conductive safety vent support having a hollow rivet protrusion passing through said vent hole of said cap cover; and
   a conductive safety vent whose upper circumferential portion combines with the bottom surface of said safety vent support to seal the hollow of said rivet protrusion, and whose vertex contacts the upper surface of said positive electrode tab,
   wherein said vertex of said safety vent separates from said positive electrode tab when the internal pressure of said battery increases to a predetermined level.

2. The cap assembly for a rectangular battery as claimed in claim 1, wherein said vertex attaches to the upper surface of said positive electrode tab by a laser welding.

3. The cap assembly for a rectangular battery as claimed in claim 1, further comprising:
   a tab fixing portion combined with the upper surface of said positive electrode tab, and having a through hole leading to said vent hole formed therein and a hooking portion formed at upper edge thereof; and
   a support having a combining portion with which said hooking portion combines, and a through hole leading to said vent hole, formed therein.

4. The cap assembly for a rectangular battery as claimed in claim 1, wherein said safety vent has a conical shape.

5. The cap assembly for a rectangular battery as claimed in claim 1, further comprising a positive electrode terminal which has a through hole leading to said vent hole and combines with the upper portion of said cap cover having an insulating plate interposed therebetween.

\* \* \* \* \*